United States Patent
Kosugi

(10) Patent No.: US 9,455,592 B2
(45) Date of Patent: Sep. 27, 2016

(54) ELECTRONIC APPARATUS AND CONTROL METHOD FOR WIRELESSLY RECEIVING POWER FROM A POWER SUPPLY APPARATUS

(71) Applicant: CANON KABUSHIKI KAISHA, Tokyo (JP)

(72) Inventor: Takamichi Kosugi, Fuchu (JP)

(73) Assignee: Canon Kabushiki Kaisha, Tokyo (JP)

(*) Notice: Subject to any disclaimer, the term of this patent is extended or adjusted under 35 U.S.C. 154(b) by 157 days.

(21) Appl. No.: 14/064,906

(22) Filed: Oct. 28, 2013

(65) Prior Publication Data

US 2014/0117931 A1    May 1, 2014

(30) Foreign Application Priority Data

Oct. 30, 2012 (JP) ................................. 2012-239282

(51) Int. Cl.
| | | |
|---|---|---|
| *H01M 10/44* | (2006.01) | |
| *H01M 10/46* | (2006.01) | |
| *H02J 7/02* | (2016.01) | |
| *H02J 5/00* | (2016.01) | |
| *H02J 7/00* | (2006.01) | |

(52) U.S. Cl.
CPC ............... *H02J 7/025* (2013.01); *H02J 5/005* (2013.01); *H02J 7/0044* (2013.01)

(58) Field of Classification Search
CPC ................................. H02J 5/005; H02J 7/025
USPC .................. 320/107, 108, 114, 115; 307/104
See application file for complete search history.

(56) References Cited

U.S. PATENT DOCUMENTS

| | | | |
|---|---|---|---|
| 2010/0194335 A1* | 8/2010 | Kirby ...................... | H02J 5/005 320/108 |
| 2010/0201311 A1* | 8/2010 | Lyell Kirby .............. | A61L 2/02 320/108 |
| 2010/0277120 A1* | 11/2010 | Cook ................... | H01Q 19/005 320/108 |

FOREIGN PATENT DOCUMENTS

| | | |
|---|---|---|
| JP | H1125238 A | 1/1999 |
| JP | 2002064402 A | 2/2002 |
| JP | 2008-113519 A | 5/2008 |
| JP | 2010148210 A | 7/2010 |
| JP | 2012095435 A | 5/2012 |

OTHER PUBLICATIONS

English translation of JP2012095435 (A), Canon KK, May 17, 2012.*

* cited by examiner

*Primary Examiner* — Edward Tso
(74) *Attorney, Agent, or Firm* — Canon U.S.A., Inc. IP Division

(57) ABSTRACT

An electronic apparatus includes a power receiving unit configured to wirelessly receive power from an external apparatus, a resonance unit configured to set at least one of a resonant frequency of the power receiving unit and a characteristic value of the electronic apparatus, the characteristic value indicating a resonance characteristic of the electronic apparatus, and a control unit configured to, before the electronic apparatus performs a predetermined operation, detect data indicating power for performing the predetermined operation, and control the resonance unit to set at least one of the resonant frequency of the power receiving unit and the characteristic value of the electronic apparatus based on the detected data, wherein the control unit is configured to perform the predetermined operation by using power received based on the at least one of the resonant frequency and the characteristic value of the electronic apparatus set by the resonance unit.

20 Claims, 8 Drawing Sheets

FIG.7A

| POWER Wn [W] | W$_1$ | W$_2$ | W$_3$ | W$_4$ | W$_5$ | W$_6$ | W$_7$ | W$_8$ | W$_9$ | W$_{10}$ |
|---|---|---|---|---|---|---|---|---|---|---|
| RESONANT FREQUENCY fn [Hz] | f$_1$ | f$_2$ | f$_3$ | f$_4$ | f$_5$ | f$_6$ | f$_7$ | f$_8$ | f$_9$ | f$_{10}$ |

FIG.7B

| POWER RECEPTION EFFICIENCY En [W] | E$_1$ | E$_2$ | E$_3$ | E$_4$ | E$_5$ | E$_6$ | E$_7$ | E$_8$ | E$_9$ | E$_{10}$ |
|---|---|---|---|---|---|---|---|---|---|---|
| RESONANT FREQUENCY fn [Hz] | f$_1$ | f$_2$ | f$_3$ | f$_4$ | f$_5$ | f$_6$ | f$_7$ | f$_8$ | f$_9$ | f$_{10}$ |

FIG.7C

| POWER Wn [W] | W$_1$ | W$_2$ | W$_3$ | W$_4$ | W$_5$ | W$_6$ | W$_7$ | W$_8$ | W$_9$ | W$_{10}$ |
|---|---|---|---|---|---|---|---|---|---|---|
| Q VALUE | Q$_1$ | Q$_2$ | Q$_3$ | Q$_4$ | Q$_5$ | Q$_6$ | Q$_7$ | Q$_8$ | Q$_9$ | Q$_{10}$ |

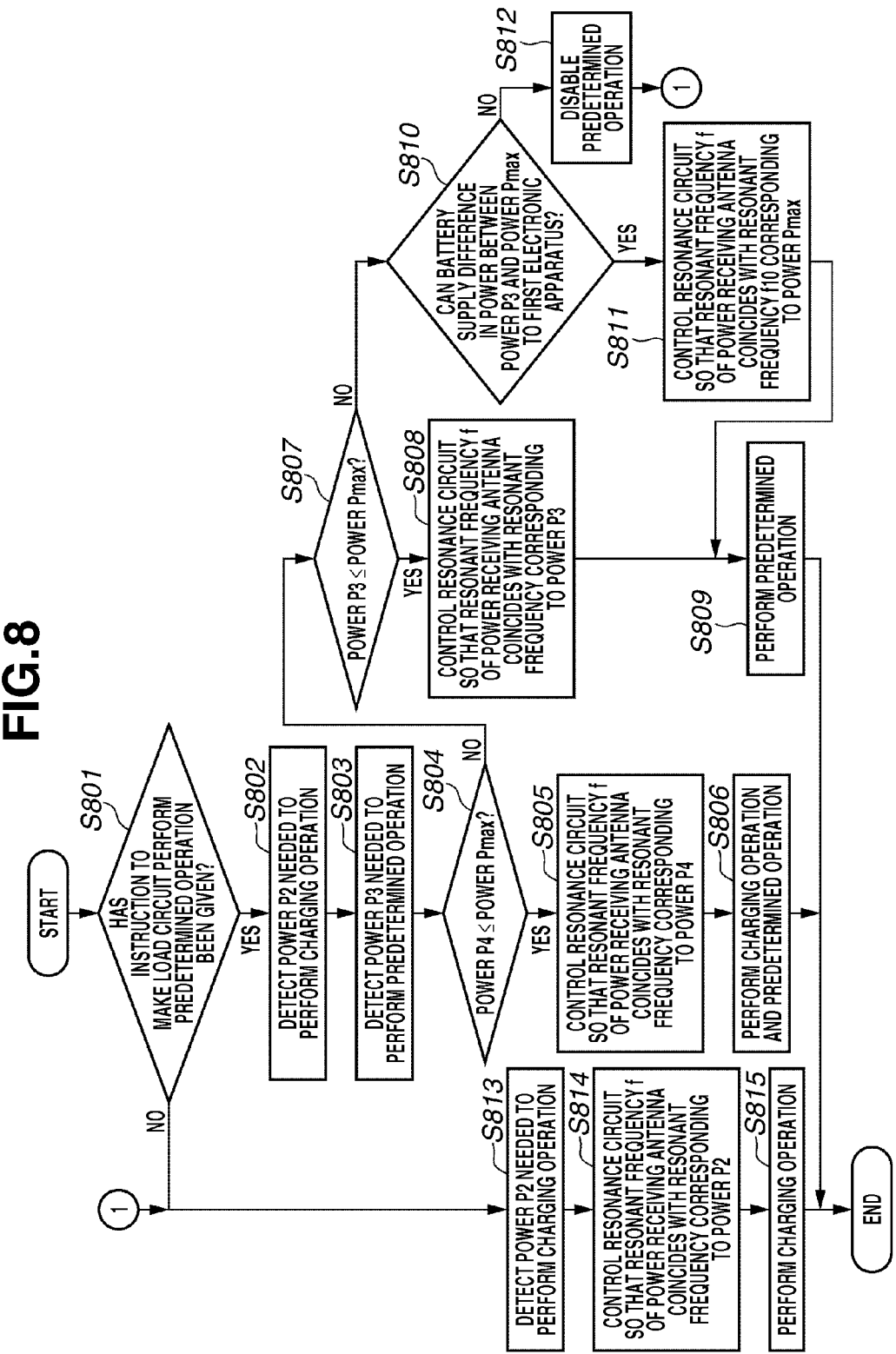

ELECTRONIC APPARATUS AND CONTROL METHOD FOR WIRELESSLY RECEIVING POWER FROM A POWER SUPPLY APPARATUS

BACKGROUND OF THE INVENTION

1. Field of the Invention

The present invention relates to an electronic apparatus which wirelessly receives power from a power supply apparatus.

2. Description of the Related Art

A wireless charging system including a power supply apparatus that wirelessly outputs power without using a connector and an electronic apparatus that charges a battery with power wirelessly received from the power supply apparatus has recently been known. As such a wireless charging system, Japanese Patent Application Laid-Open No. 2008-113519 discusses a power supply apparatus that performs both data communication for transmitting a command to check the time required for charging and the power transmission to the electronic apparatus via the same antenna.

The power supply apparatus that uses the same antenna to perform command communication with the electronic apparatus and the process for transmitting the charging power with which the electronic apparatus charges the battery, has heretofore been unable to simultaneously perform the command communication with the electronic apparatus and the process for transmitting the charging power to the electronic apparatus. The power supply apparatus thus needs to alternately perform the command communication with the electronic apparatus and the process for transmitting the charging power to the electronic apparatus.

When the power supply apparatus is outputting the charging power to the electronic apparatus, the power supply apparatus cannot perform the command communication with the electronic apparatus and thus cannot check the charging state of the electronic apparatus. Consequently, even if the electronic apparatus has completed charging, the power supply apparatus may continue supplying the charging power to the electronic apparatus until the command communication with the electronic apparatus is performed. In such a case, the electronic apparatus is supplied with excessive power, which is wasted in the electronic apparatus. For example, if the power supply apparatus supplies charging power to both the electronic apparatus and a specific apparatus different from the electronic apparatus, the supply of excessive power to the electronic apparatus can cause a shortage of power which is to be supplied to the specific apparatus. Such a problem can also occur in a wireless charging system including a power supply apparatus other than one that performs data communication and power transmission to an electronic apparatus by using the same antenna.

SUMMARY OF THE INVENTION

The present invention is directed to limiting the power to be supplied from the power supply apparatus according to the state of the electronic apparatus, thereby preventing excessive power from being supplied to the electronic apparatus.

According to an aspect of the present invention, at least one of the above-described drawbacks and disadvantages are overcome.

According to another aspect of the present invention, there is provided an electronic apparatus including a power receiving unit configured to wirelessly receive power from an external apparatus, a resonance unit configured to set at least either one of a resonant frequency of the power receiving unit and a characteristic value of the electronic apparatus, the characteristic value indicating a resonance characteristic of the electronic apparatus, and a control unit configured to, before the electronic apparatus performs a predetermined operation, detect data indicating power for performing the predetermined operation, and control the resonance unit to set at least one of the resonant frequency of the power receiving unit and the characteristic value of the electronic apparatus based on the detected data, wherein the control unit is configured to perform the predetermined operation by using the at least one of the power received based on the resonant frequency and the characteristic value of the electronic apparatus set by the resonance unit.

According to another aspect of the present invention, there is provided a method for controlling an electronic apparatus including a power receiving unit configured to wirelessly receive power from an external apparatus, the method including before the electronic apparatus performs a predetermined operation, detecting data indicating power for performing the predetermined operation, before the electronic apparatus performs the predetermined operation, setting at least one of a resonant frequency of the power receiving unit and a characteristic value of the electronic apparatus based on the detected data, the characteristic value indicating a resonance characteristic of the electronic apparatus, and performing the predetermined operation by using the at least one of the power received based on the set resonant frequency and characteristic value of the electronic apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A, 7B, and 7C are diagrams illustrating first to third tables according to the first and second exemplary embodiments of the present invention.

FIG. 8 is a flowchart illustrating an example of power reception control process performed by the first electronic apparatus according to the first and second exemplary embodiments of the present invention.

DESCRIPTION OF THE EMBODIMENTS

Various exemplary embodiments, features, and aspects of the invention will be described in detail below with reference to the drawings.

Note that the following exemplary embodiments are just a few examples. The present invention is not limited to the following exemplary embodiments.

Figure 1:
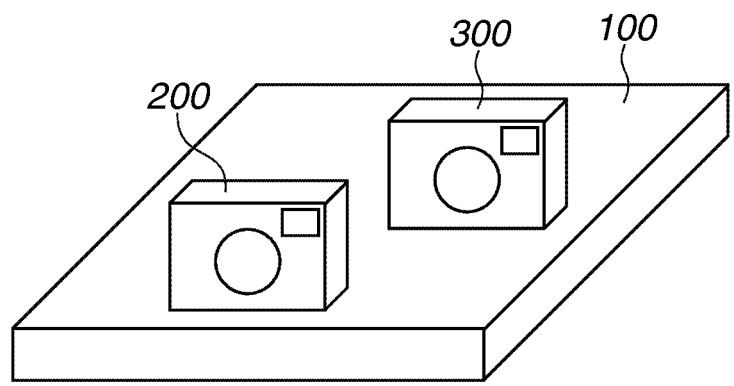
FIG. 1 is a diagram illustrating an example of a wireless charging system according to first and second exemplary embodiments of the present invention.

A first exemplary embodiment of the present invention will be described in detail below with reference to the drawings. As illustrated in FIG. 1, a wireless charging system according to the first exemplary embodiment includes a power supply apparatus 100, a first electronic apparatus 200, and a second electronic apparatus 300. If the first electronic apparatus 200 and the second electronic apparatus 300 are placed on the power supply apparatus 100 as illustrated in FIG. 1, the power supply apparatus 100 wirelessly supplies power to the first electronic apparatus 200 and the second electronic apparatus 300. In such a case, the first electronic apparatus 200 can wirelessly receive the power supplied from the power supply apparatus 100 without the intervention of a connector. The second electronic apparatus 300 can wirelessly receive the power supplied from the power supply apparatus 100 without the intervention of a connector. The power supply apparatus 100 supplies the power according to a magnetic field resonance method. The magnetic field resonance method is a power transmission method for transmitting power from the power supply apparatus 100 to a power receiving apparatus while the power supply apparatus 100 and the power receiving apparatus are resonating with each other. The state where the power supply apparatus 100 and the power receiving apparatus resonate with each other refers to a state where the resonant frequency of an antenna the power supply apparatus 100 uses to supply power coincides with that of an antenna the power receiving apparatus uses to receive the power. The magnetic field resonance method may also be referred to as a "magnetic field coupling method."

The first electronic apparatus 200 may be an imaging apparatus such as a digital still camera and a digital video camera. The first electronic apparatus 200 may also be a reproduction apparatus that reproduces audio data and/or video data. Further, the first electronic apparatus 200 may also be a mobile communication apparatus such as a mobile phone and a smartphone. Furthermore, the first electronic apparatus 200 may be a battery pack or an automobile or a television broadcast receiving apparatus.

Like the first electronic apparatus 200, the second electronic apparatus 300 may be an imaging apparatus, a reproduction apparatus, a mobile communication apparatus, or a battery pack. The second electronic apparatus 300 may be an automobile or a television broadcast receiving apparatus.

Figure 2:
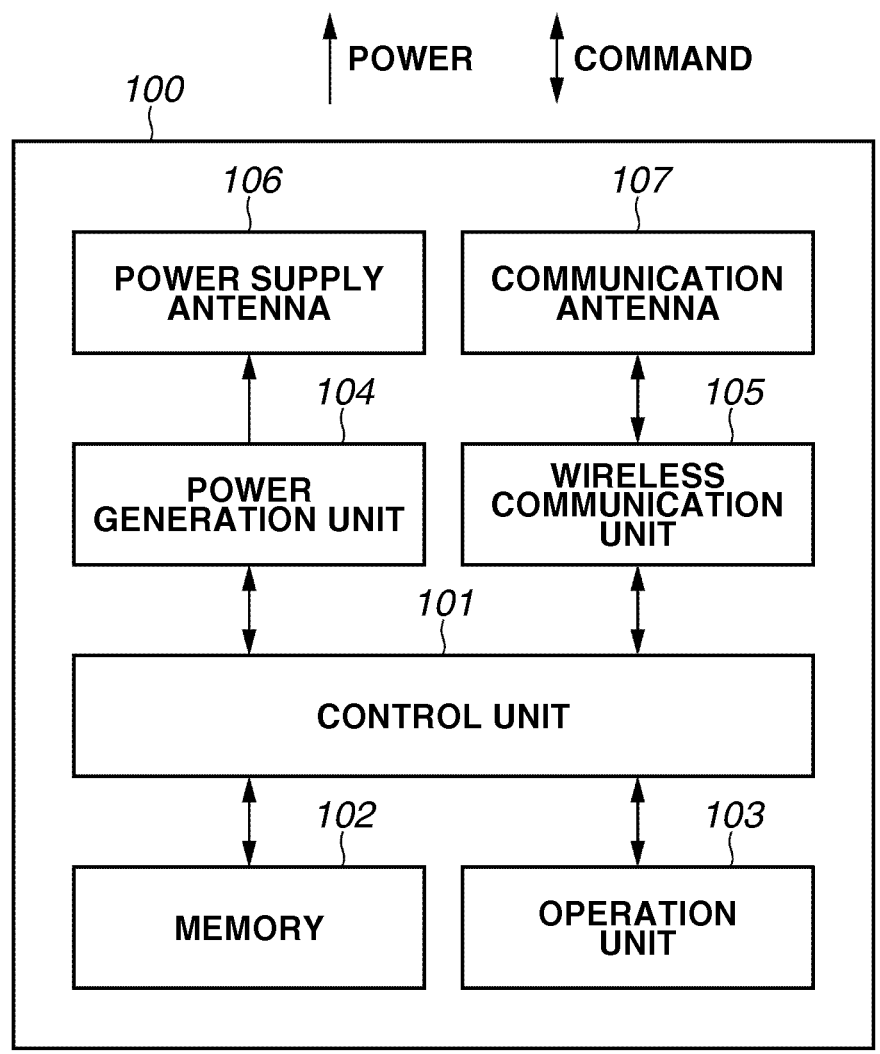
FIG. 2 is a block diagram illustrating an example of a power supply apparatus according to the first and second exemplary embodiments of the present invention.

FIG. 2 is a block diagram illustrating an example of a configuration of the power supply apparatus 100 according to the first exemplary embodiment. As illustrated in FIG. 2, the power supply apparatus 100 includes a control unit 101, a memory 102, an operation unit 103, a power generation unit 104, a wireless communication unit 105, a power supply antenna 106, and a communication antenna 107.

The control unit 101 controls the power supply apparatus 100. The control unit 101 controls the power generation unit 104 to control power to be supplied to at least one of the first electronic apparatus 200 and the second electronic apparatus 300. The control unit 101 further controls the wireless communication unit 105 to perform wireless communication with at least one of the first electronic apparatus 200 and the second electronic apparatus 300.

The memory 102 stores a computer program for controlling the power supply apparatus 100 and information about parameters of the power supply apparatus 100. The memory 102 further records data obtained by the wireless communication unit 105. The control unit 101 controls the power supply apparatus 100 by executing the computer program recorded in the memory 102.

The operation unit 103 provides a user interface for operating the power supply apparatus 100. The operation unit 103 includes a power button for the power supply apparatus 100 and a mode switch button for the power supply apparatus 100. The buttons are composed of switches and/or a touch panel. The control unit 101 controls the power supply apparatus 100 according to input signals input via the operation unit 103.

The power generation unit 104 generates power to be output to outside via the power supply antenna 106. A not-illustrated alternating-current power source is connected to the power supply apparatus 100. The power generation unit 104 generates the power to be output to outside from the power supplied from the alternating-current power source. The power generated by the power generation unit 104 is supplied to the power supply antenna 106.

The wireless communication unit 105 performs wireless communication with at least one of the first electronic apparatus 200 and the second electronic apparatus 300. For example, the wireless communication 105 can perform wireless communication compliant with a wireless local area network (LAN) standard. The wireless communication unit 105 can transmit a command, video data, and audio data to at least one of the first electronic apparatus 200 and the second electronic apparatus 300 based on a protocol of the wireless LAN standard. The wireless communication unit 105 can also receive a command, video data, and audio data from at least one of the first electronic apparatus 200 and the second electronic apparatus 300 based on the protocol of the wireless LAN standard. The wireless communication unit 105 transmits at least one of a command, video data, and audio data to at least one of the first electronic apparatus 200 and the second electronic apparatus 300 via the communication antenna 107. The wireless communication unit 105 receives at least one of a command, video data, and audio data from at least one of the first electronic apparatus 200 and the second electronic apparatus 300 via the communication antenna 107.

The power supply antenna 106 is an antenna for outputting the power generated by the power generation unit 104, to outside. The power supply apparatus 100 supplies the power to at least one of the first electronic apparatus 200 and the second electronic apparatus 300 via the power supply antenna 106. In the first exemplary embodiment, the power supply antenna 106 of the power supply apparatus 100 has a resonant frequency f10. The resonant frequency f10 will be described below. For example, the resonant frequency f10 may be 13.56 MHz or 6.78 MHz. The resonant frequency f10 may be a frequency falling within the range of 100 kHz to 300 kHz. The resonant frequency f10 may be a frequency of approximately 1 MHz. The resonant frequency f10 may be a frequency other than those mentioned above.

The communication antenna 107 is an antenna for communicating with at least one of the first electronic apparatus 200 and the second electronic apparatus 300.

Figure 3:
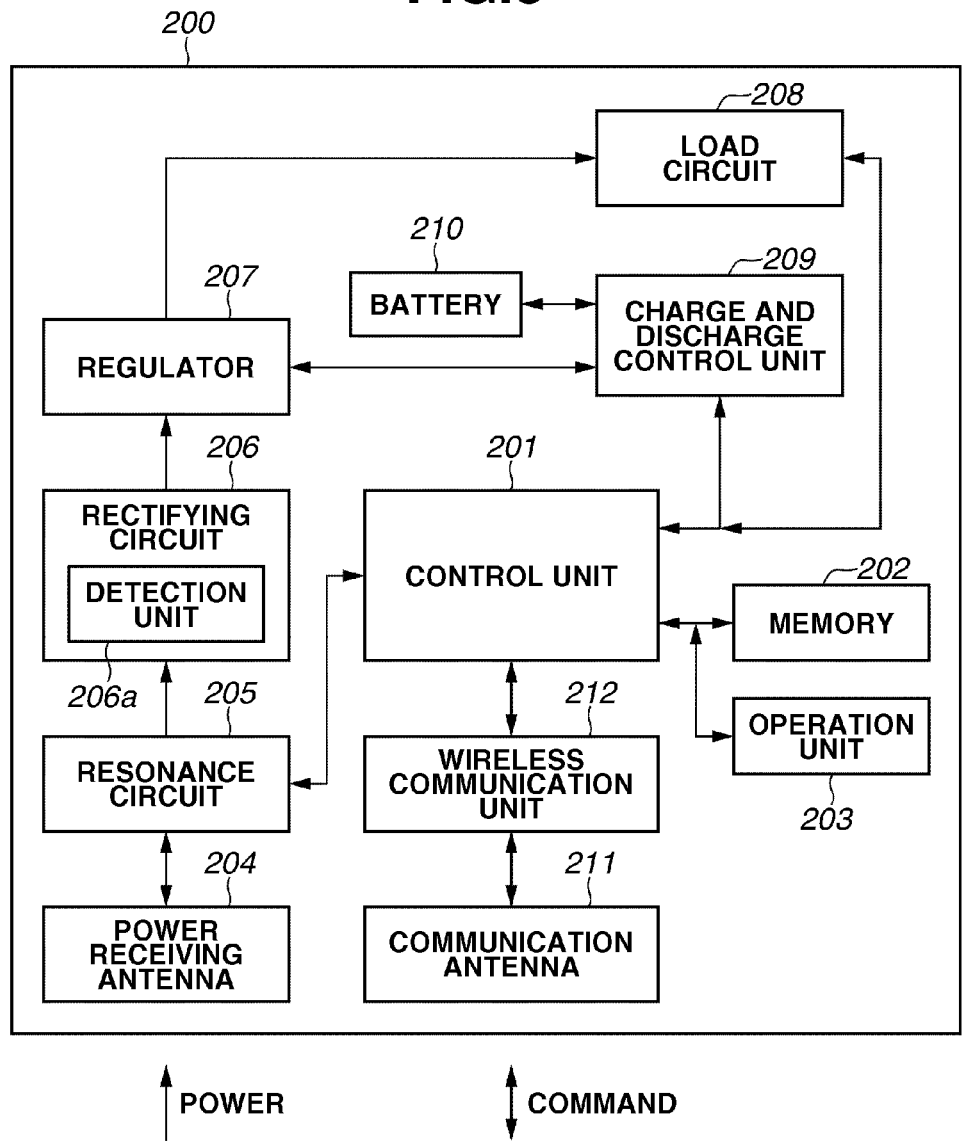
FIG. 3 is a block diagram illustrating an example of a first electronic apparatus according to the first and second exemplary embodiments of the present invention.

Next, an example of a configuration of the first electronic apparatus 200 will be described with reference to FIG. 3. The first electronic apparatus 200 includes a control unit 201, a memory 202, an operation unit 203, a power receiving antenna 204, a resonance circuit 205, a rectifying circuit 206, a regulator 207, a load circuit 208, a charge and discharge control unit 209, a battery 210, a communication antenna 211, and a wireless communication unit 212.

The control unit 201 controls the first electronic apparatus 200. The control unit 201 controls the resonance circuit 205 to receive the power output from the power supply apparatus 100. The control unit 201 further controls the wireless communication unit 212 to perform wireless communication with the power supply apparatus 100. The control unit 201 further controls the resonance circuit 205 so that a resonant frequency f of the power receiving antenna 204 coincides with the resonant frequency f10 of the power supply antenna 106. In such a state, the first electronic apparatus 200 resonates with the power supply apparatus 100.

The control unit 201 further controls the first electronic apparatus 200 according to a command received from the power supply apparatus 100.

The memory 202 stores a computer program for controlling the first electronic apparatus 200 and information about parameters of the first electronic apparatus 200. The memory 202 further records data obtained by the wireless communication unit 212. The control unit 201 controls the first electronic apparatus 200 by executing the computer program recorded in the memory 202.

The operation unit 203 provides a user interface for operating the first electronic apparatus 200. The control unit 201 controls the first electronic apparatus 200 according to an input signal input via the operation unit 203.

The power receiving antenna 204 is an antenna for receiving the power supplied from the power supply apparatus 100. The first electronic apparatus 200 receives the power from the power supply apparatus 100 via the power receiving antenna 204. The power received from the power supply apparatus 100 via the power receiving antenna 204 is supplied to the rectifying circuit 206 via the resonance circuit 205.

Figure 4:
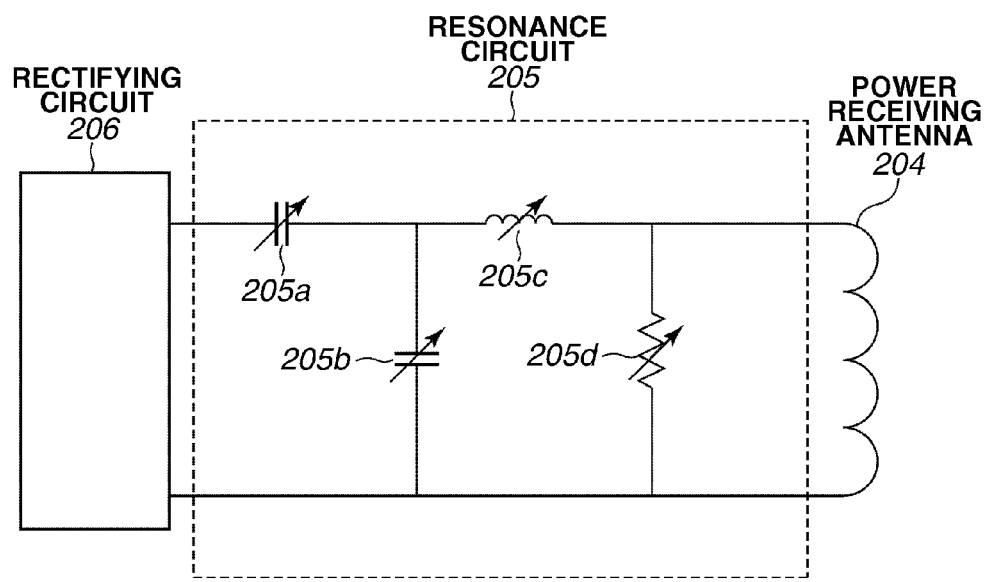
FIG. 4 is a diagram illustrating a resonance circuit of the first electronic apparatus according to the first and second exemplary embodiments of the present invention.

The resonance circuit 205 is a circuit for setting the resonant frequency f of the power receiving antenna 204. FIG. 4 illustrates an example of a configuration of the resonance circuit 205. As illustrated in FIG. 4, the resonance circuit 205 includes variable capacitors 205a and 205b, a variable coil 205c, and a variable resistor 205d. The control unit 201 can set the resonant frequency f of the power receiving antenna 204 by controlling the value of at least one of the variable capacitors 205a and 205b, the variable coil 205c, and the variable resistor 205d.

The resonant frequency f of the power receiving antenna 204 is expressed by the following equation (1):

$$f = \frac{1}{2\pi\sqrt{LC}} \quad (1)$$

where L is the inductance of the resonance circuit 205 and the power receiving antenna 204, and C is the capacitance of the resonance circuit 205.

The control unit 201 can change L and C in equation (1) by changing the capacitance values of the variable capacitors 205a and 205b, and the inductance value of the variable coil 205c. As a result, the control unit 201 can perform control to change the resonant frequency f of the first electronic apparatus 200. To strengthen or weaken the resonant coupling state between the first electronic apparatus 200 and the power supply apparatus 100, the control unit 201 controls the resonance circuit 205 to change the resonant frequency f of the first electronic apparatus 200.

Figure 5:
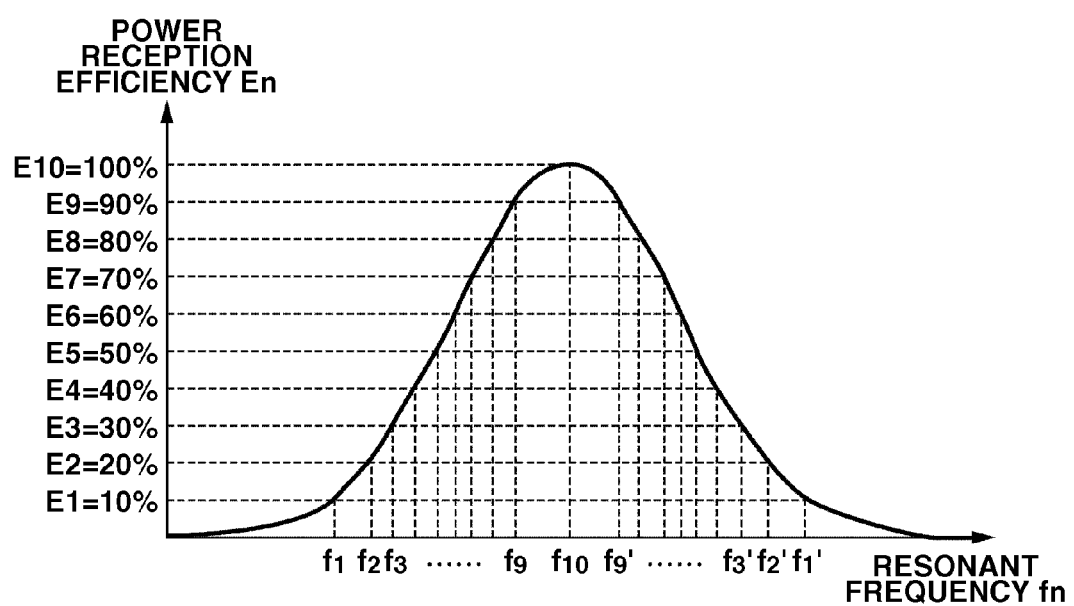
FIG. 5 is a chart illustrating an example of the relationship between a resonant frequency fn of a power receiving antenna and a power reception efficiency En according to the first and second exemplary embodiments of the present invention.

FIG. 5 is a chart illustrating the relationship between the resonant frequency fn of the power receiving antenna 204 and a power reception efficiency En of the first electronic apparatus 200 when the power supply antenna 106 has the resonant frequency of f10. The horizontal axis of the chart illustrated in FIG. 5 corresponds to the resonant frequency fn of the power receiving antenna 204 set by the resonance circuit 205. The vertical axis of the chart illustrated in FIG. 5 corresponds to the power reception efficiency En of the first electronic apparatus 200. The power reception efficiency En indicates the ratio of the power the first electronic apparatus 200 receives from the power supply apparatus 100 with respect to the power the power supply apparatus 100 outputs to the first electronic apparatus 200.

The power supply apparatus 100 supplies power by the magnetic field resonance method. In order for the first electronic apparatus 200 to receive high power from the power supply apparatus 100, the control unit 201 needs to increase the power reception efficiency En. In such a case, the control unit 201 controls the resonance circuit 205 so that the resonant frequency f of the power receiving antenna 204 coincides with the resonant frequency f10 of the power supply antenna 106. This strengthens the resonant coupling state between the first electronic apparatus 200 and the power supply apparatus 100 to increase the power reception efficiency En.

To reduce the power the first electronic apparatus 200 receives from the power supply apparatus 100 when the power supply apparatus 100 supplies power by the magnetic field resonance method, the control unit 201 needs to reduce the power reception efficiency En. In such a case, the control unit 201 controls the resonance circuit 205 so that the resonant frequency f of the power receiving antenna 204 does not coincide with the resonant frequency f10 of the power supply antenna 106. This weakens the resonant coupling state between the first electronic apparatus 200 and the power supply apparatus 100 to reduce the power reception efficiency En.

Aside from controlling the resonant frequency f of the power receiving antenna 204, the control unit 201 may control the power reception efficiency En by controlling the resonance characteristics of the first electronic apparatus 200.

Among characteristic values indicating the resonance characteristics of the first electronic apparatus 200 is one called quality factor (hereinafter, referred to as "Q value"). As a method for controlling the power reception efficiency En, the control unit 201 may control the Q value of the first electronic apparatus 200. The higher the Q value of the first electronic apparatus 200, the stronger the resonant coupling state between the first electronic apparatus 200 and the power supply apparatus 100. This increases the power reception efficiency En, and the first electronic apparatus 200 can receive more power from the power supply apparatus 100. The lower the Q value of the first electronic apparatus 200, the weaker the resonant coupling state between the first electronic apparatus 200 and the power supply apparatus 100. This reduces the power the first electronic apparatus 200 can receive from the power supply apparatus 100.

The Q value of the first electronic apparatus 200 is expressed by the following equation (2):

$$Q = \frac{1}{R}\sqrt{\frac{L}{C}} \qquad (2)$$

where L is the inductance of the resonance circuit 205 and the power receiving antenna 204, C is the capacitance of the resonance circuit 205, and R is the impedance of the resonance circuit 205.

The control unit 201 changes the capacitance values of the variable capacitors 205a and 205b, the inductance value of the variable coil 205c, and the impedance value of the variable resistor 205d. This changes L, C, and R in equation (2), whereby the control unit 201 can perform control to change the Q value of the first electronic apparatus 200. To strengthen or weaken the resonant coupling state between the first electronic apparatus 200 and the power supply apparatus 100, the control unit 201 controls the resonance circuit 205 to change the Q value of the first electronic apparatus 200.

The rectifying circuit 206 generates direct-current power from the power received by the power receiving antenna 204. The rectifying circuit 206 supplies the generated direct-current power to the regulator 207. The rectifying circuit 206 includes a detection unit 206a which detects the value of the power received by the power receiving antenna 204. The detection unit 206a supplies information indicating the value of the received power detected by the detection unit 206a, to the control unit 201.

The regulator 207 supplies at least one of the power supplied from the rectifying circuit 206 and power supplied from the battery 210, to the components of the first electronic apparatus 200 according to an instruction from the control unit 201. The regulator 207 supplies one of the power supplied from the rectifying circuit 206 and the power supplied from the battery 210 to the components of the first electronic apparatus 200 according to an instruction from the control unit 201. For example, if the regulator 207 is instructed by the control unit 201 to supply power to the load circuit 208, the regular 207 supplies at least one of the power supplied from the rectifying circuit 206 and the power supplied from the battery 210 to the load circuit 208. For example, if the regulator 207 is instructed by the control unit 201 to supply power to the charge and discharge control unit 209, the regulator 207 supplies the power supplied from the rectifying circuit 206 to the charge and discharge control unit 209. Examples of the regular 207 include a series regulator and a switching regulator.

The load circuit 208 performs a predetermined operation by using the power supplied from the regulator 207. Examples of the predetermined operation include an operation for capturing image data such as a moving image and a still image, and an operation for reproducing image data. Examples of the predetermined operation may include an operation for transmitting at least one of image data and audio data by using the wireless communication unit 212, and an operation for receiving at least one of image data and audio data by using the wireless communication unit 212. Examples of the predetermined operation may include an operation for transmitting and receiving mails, and an operation for receiving a television broadcast.

The charge and discharge control unit 209 controls the charging of the battery 210, and controls the discharging of the battery 210. The charge and discharge control unit 209 controls whether to charge the battery 201 with the power supplied from the regulator 207 or supply power discharged from the battery 210 to the regulator 207 according to an instruction from the control unit 201. The charge and discharge control unit 209 regularly detects the remaining level of the battery 210. The charge and discharge control 209 supplies information indicating the remaining level of the battery 210 detected by the charge and discharge control unit 209 to the control unit 201.

The battery 210 is a battery connectable to the first electronic apparatus 200. The battery 210 is a rechargeable secondary battery. Examples include a lithium ion battery. The battery 210 may be other than a lithium ion battery.

The communication antenna 211 is an antenna for communicating with at least one of the power supply apparatus 100 and the second electronic apparatus 300.

The wireless communication unit 212 performs wireless communication with at least one of the power supply apparatus 100 and the second electronic apparatus 300. For example, the wireless communication unit 212 can perform wireless communication compliant with a wireless LAN standard. The wireless communication unit 212 can transmit a command, image data, and audio data to at least one of the power supply apparatus 100 and the second electronic apparatus 300 based on a protocol of the wireless LAN standard. The wireless communication unit 212 can receive a command, video data, and audio data from at least one of the power supply apparatus 100 and the second electronic apparatus 300 based on the protocol of the wireless LAN standard. The wireless communication unit 212 transmits at least any one of a command, video data, and audio data to at least one of the power supply apparatus 100 and the second electronic apparatus 300 via the communication antenna 107. The wireless communication unit 212 receives at least any one of a command, image data, and audio data from at least one of the power supply apparatus 100 and the second electronic apparatus 300 via the communication antenna 107.

The configuration of the first electronic apparatus 200 has been described above. The second electronic apparatus 300 has a similar configuration to that of the first electronic apparatus 200. A description of the second electronic apparatus 300 will thus be omitted.

The power supply apparatus 100 is configured to include the power supply antenna 106 and the communication antenna 107 separately. However, the exemplary embodiment is not limited to that configuration. For example, the power supply apparatus 100 may be configured so that a single antenna serves both as the power supply antenna 106 and the communication antenna 107. In such a case, the power supply apparatus 100 alternately performs data communication and power transmission because the power supply apparatus 100 cannot simultaneously perform data communication and power transmission.

The first electronic apparatus 200 is configured to include the power receiving antenna 204 and the communication antenna 211 separately. However, the exemplary embodiment is not limited to that configuration. For example, the first electronic apparatus 200 may be configured so that a single antenna serves both as the power receiving antenna 204 and the communication antenna 211. In such a case, the first electronic apparatus 200 alternately performs data communication and power reception since it cannot simultaneously perform data communication and power reception.

The second electronic apparatus 300 has a similar configuration to that of the first electronic apparatus 200.

(Control Process)

Next, control process to be performed by the first electronic apparatus 200 will be described with reference to the flowchart of FIG. 6. The first electronic apparatus 200 performs the control process when the first electronic apparatus 200 is placed near the power supply apparatus 100. The control process of FIG. 6 can be implemented by the control unit 201 executing a computer program stored in the memory 202. During the control process of FIG. 6, the power supply antenna 106 has the resonant frequency f10.

In step S601, the control unit 201 determines whether the first electronic apparatus 200 exists near the power supply apparatus 100.

For example, the control unit 201 determines whether the first electronic apparatus 200 exists near the power supply apparatus 100 according to whether the received power detected by the detection unit 206a is higher than or equal to predetermined power. If the control unit 201 detects that the received power detected by the detection unit 206a is higher than or equal to the predetermined power, the control unit 201 determines that the first electronic apparatus 200 exists near the power supply apparatus 100. If the control unit 201 detects that the received power detected by the detection unit 206a is not equal to or higher than the predetermined power, the control unit 201 determines that the first electronic apparatus 200 does not exist near the power supply apparatus 100. An example of the predetermined power is 0.5 to 1 W.

Alternatively, for example, the control unit 201 may determine whether the first electronic apparatus 200 exists near the power supply apparatus 100 according to whether the wireless communication unit 212 can perform wireless communication with the power supply apparatus 100 via the communication antenna 211. If the control unit 201 detects that the wireless communication unit 212 can perform wireless communication with the power supply apparatus 100 via the communication antenna 211, the control unit 201 determines that the first electronic apparatus 200 exists near the power supply apparatus 100. If the control unit 201 detects that the wireless communication unit 212 cannot perform wireless communication with the power supply apparatus 100 via the communication antenna 211, the control unit 201 determines that the first electronic apparatus 200 does not exist near the power supply apparatus 100.

If the control unit 201 determines that the first electronic apparatus 200 exists near the power supply apparatus 100 (YES in step S601), the flowchart proceeds from step S601 to step S602. If the control unit 201 determines that the first electronic apparatus 200 does not exist near the power supply apparatus 100 (NO in step S601), the flowchart ends.

In step S602, the control unit 201 controls the resonance circuit 205 so that the resonant frequency f of the power receiving antenna 204 coincides with the resonant frequency f10 of the power supply antenna 106. This maximizes the resonant coupling state between the first electronic apparatus 200 and the power supply apparatus 100.

For example, the control unit 201 may transmit a command for requesting a notification of the resonant frequency of the power supply antenna 106, to the power supply apparatus 100 via the wireless communication unit 212. The control unit 201 receives the information indicating the resonant frequency of the power supply antenna 106 from the power supply apparatus 100. The control unit 201 then controls the resonance circuit 205 so that the resonant frequency f of the power receiving antenna 204 coincides with the resonant frequency of the power supply antenna 106 notified by the power supply apparatus 100.

For example, the control unit 201 may control the resonance circuit 205 stepwise so that the resonant frequency f of the power receiving antenna 204 coincides with a frequency that maximizes the power the power receiving antenna 204 actually receives from the power supply apparatus 100.

After the resonant frequency f of the power receiving antenna 204 is subjected to the control, the flowchart proceeds from step S602 to step S603.

In step S603, the control unit 201 detects power Pmax which is the maximum power the first electronic apparatus 200 can receive from the power supply apparatus 100.

For example, the control unit 201 controls the detection unit 206a to detect, as the power Pmax, the maximum value of the received power among those detected when the resonant frequency f of the power receiving antenna 204 is under control as in step S602.

For example, the control unit 201 may detect the power Pmax according to information indicating the maximum supply power the power supply apparatus 100 can supply and information indicating the maximum power the first electronic apparatus 200 can receive. In such a case, the control unit 201 obtains the information indicating the maximum supply power the power supply apparatus 100 can supply from the power supply apparatus 100 via the wireless communication unit 212. The information indicating the maximum power the first electronic apparatus 200 can receive is recorded in the memory 202 in advance. For example, if the maximum supply power the power supply apparatus 100 can supply is "10 W" and the maximum power the first electronic apparatus 200 can receive is "6 W," the control unit 201 detects that the power Pmax is "6 W." For example, if the maximum supply power the power supply apparatus 100 can supply is "6 W" and the maximum power the first electronic apparatus 200 can receive is "10 W," the control unit 201 detects that the power Pmax is "6 W."

In the foregoing case, the control unit 201 may detect the power Pmax in consideration of a power transmission loss due to the position and/or orientation of the first electronic apparatus 200.

When the power Pmax is detected, the control unit 201 stores information indicating the detected power Pmax in the memory 202. The flowchart proceeds from step S603 to step S604.

In step S604, the control unit 201 performs a power reception control process. The power reception control will be described below. After the power reception control process, the flowchart proceeds from step S604 to step S605.

In step S605, the control unit 201 determines whether an instruction to change the first electronic apparatus 200 into a power saving mode has been given. The power saving mode is a mode for limiting the power supply to part or all of the first electronic apparatus 200. For example, suppose that the first electronic apparatus 200 is in the power saving mode. In such a case, the control unit 201 controls the regulator 207 to stop the power supply to the load circuit 208 and the battery 210 so that the predetermined operation of the load circuit 208 and the charging of the battery 210 will not be performed. Even if the first electronic apparatus 200 is in the power saving mode, the power received via the power receiving antenna 204 is supplied to the control unit 201, the memory 202, the operation unit 203, the resonance circuit 205, the rectifying circuit 206, the wireless communication unit 212, and the regulator 207. The control unit 201 may control the regulator 207 to supply certain power to the charge and discharge control unit 209 so that the charge and discharge control unit 209 regularly detects the remaining level of the battery 210.

If the user has made an operation for changing the first electronic apparatus 200 into the power saving mode on the operation unit 203 while the first electronic apparatus 200 is powered on, the control unit 201 determines that an instruction to change the first electronic apparatus 200 into the power saving mode has been given (YES in step S605). In such a case (YES in step S605), the flowchart proceeds from step S605 to step S606. If the user has not made the operation for changing the first electronic apparatus 200 into the power saving mode, the control unit 201 determines that no instruction to change the first electronic apparatus 200 into the power saving mode has been given (NO in step S605). In such a case (NO in step S605), the flowchart proceeds from step S605 to step S607.

For example, if a predetermined period has elapsed without operating the operation unit 203 with the first electronic apparatus 200 powered on, the control unit 201 automatically changes the first electronic apparatus 200 into the power saving mode. In other words, if the predetermined period has elapsed without operating the operation unit 203, the control unit 201 similarly determines that an instruction to change the first electronic apparatus 200 into the power saving mode has been given (YES in step S605). In such a case (YES in step S605), the flowchart proceeds from step S605 to step S606.

If the user operates the operation unit 203 before the predetermined period has elapsed with the first electronic apparatus 200 powered on, the control unit 201 determines that no instruction to shift the first electronic apparatus 200 to the power saving mode has been given (NO in step S605). In such a case (NO in step S605), the flowchart proceeds from step S605 to step S607.

In step S606, the control unit 201 detects power P1 consumed by the first electronic apparatus 200 when the first electronic apparatus 200 is in the power saving mode. The control unit 201 further detects the resonant frequency corresponding to the power P1, and controls the resonance circuit 205 so that the resonant frequency f of the power receiving antenna 204 coincides with the resonant frequency corresponding to the power P1.

For example, the control unit 201 detects the resonant frequency corresponding to the power P1 by using a first table illustrated in FIG. 7A. The first table is a table in which power Wn received from the power supply apparatus 100 is associated with the resonant frequency fn. Using the first table, the control unit 201 detects the power Wn coinciding with the power P1, and sets the resonant frequency fn corresponding to the detected power Wn as the resonant frequency f of the power receiving antenna 204. If the control unit 201 cannot detect the power Wn coinciding with the power P1, the control unit 201 may set the resonant frequency fn corresponding to power Wn that has a small difference from the power P1 and is higher than the power P1 as the resonant frequency f of the power receiving antenna 204. The control unit 201 further controls the resonance circuit 205 so that the resonant frequency f of the power receiving antenna 204 coincides with the resonant frequency fn set by using the first table.

For example, if the power P1 corresponds to the power W1, the control unit 201 sets the resonant frequency f1 as the resonant frequency f of the power receiving antenna 204, and controls the resonance circuit 205 so that the resonant frequency f of the power receiving antenna 204 coincides with the resonant frequency f1. The control unit 201 stores information indicating the resonant frequency fn detected by using the first table, into the memory 202. Then, the flowchart ends.

In step S607, like step S601, the control unit 201 determines whether the first electronic apparatus 200 exists near the power supply apparatus 100. If the control unit 201 determines that the first electronic apparatus 200 exists near the power supply apparatus 100 (YES in step S607), the flowchart proceeds from step S607 to step S608. If the control unit 201 determines that the first electronic apparatus 200 does not exists near the power supply apparatus 100 (NO in step S607), the flowchart ends.

In step S608, the control unit 201 determines whether a variation of the received power detected by the detection unit 206a is more than a predetermined variation. If the variation of the received power detected by the detection unit 206a is more than the predetermined variation, a position of the first electronic apparatus 200 or an orientation of the first electronic apparatus 200 may be changed. In such a case, the power the first electronic apparatus 200 can receive from the power supply apparatus 100 can vary according to the orientation and/or position of the first electronic apparatus 200. The control unit 201 therefore needs to detect the power Pmax again. If a variation of the received power detected by the detection unit 206a is more than the predetermined variation, the second electronic apparatus 300 may be exists near the power supply apparatus 100 other than the first electronic apparatus 200. In such a case, the supply of the power output from the power supply apparatus 100 to the second electronic apparatus 300 may have changed the power the first electronic apparatus 200 can receive from the power supply apparatus 100. The control unit 201 therefore needs to detect the power Pmax again. Consequently, if the control unit 201 determines that the variation of the received power detected by the detection unit 206a is more than the predetermined variation (YES in step S608), the flowchart returns from step S608 to step S602. If the control unit 201 determines that the variation of the received power detected by the detection unit 206a is not more than the predetermined variation (NO in step S608), the flowchart returns from step S608 to step S604.

(Power Reception Control Process)

Next, the power reception control process in step S604 of FIG. 6 will be described with reference to the flowchart of FIG. 8. The power reception control process of FIG. 8 can be implemented by the control unit 201 executing a computer program stored in the memory 202. During the power reception control process of FIG. 8, the resonant frequency of the power supply antenna 106 is frequency of f10.

In step S801, the control unit 201 determines whether an instruction for causing the load circuit 208 to perform the predetermined operation has been given. If the control unit 201 determines that an instruction for causing the load circuit 208 to perform the predetermined operation has been given (YES in step S801), the flowchart proceeds from step S801 to step S802. If the control unit 201 determines that no instruction for causing to the load circuit 208 to perform the predetermined operation has been given (NO in step S801), the flowchart proceeds from step S801 to step S813.

In step S802, the control unit 201 detects power P2 by using the information indicating the remaining level of the battery 210 detected by the charge and discharge control unit 209. The power P2 is power needed to perform an operation for charging the battery 210. The control unit 201 stores information indicating the power P2 in the memory 202. The flowchart proceeds from step S802 to step S803.

In step S803, according to the instruction for causing the load circuit 208 to perform the predetermined operation, the control unit 201 detects power P3 needed to perform the predetermined operation. The control unit 201 stores information indicating the power P3 in the memory 202. The flowchart proceeds from step S803 to step S804.

In step S804, the control unit 201 detects power P4 to be received from the power supply apparatus 100 according to the power P2 detected in step S802 and the power P3 detected in step S803. For example, the control unit 201 calculates the power P4 from the sum of the power P2 and the power P3. In step S804, the control unit 201 further determines whether the power P4 is lower than or equal to the power Pmax. If the control unit 201 determines that the power P4 is lower than or equal to the power Pmax (YES in step S804), the flowchart proceeds from step S804 to step S805. If the control unit 201 determines that the power P4 is not equal to or lower than the power Pmax (NO in step S804), the flowchart proceeds from step S804 to step S807.

In step S805, the control unit 201 detects the resonant frequency corresponding to the power P4, and controls the resonance circuit 205 so that the resonant frequency f of the power receiving antenna 204 coincides with the resonant frequency corresponding to the power P4.

For example, the control unit 201 detects the resonant frequency corresponding to the power P4 by using the first table of FIG. 7A. Using the first table, the control unit 201 detects the power Wn coinciding with the power P4, and sets the resonant frequency fn corresponding to the detected power Wn as the resonant frequency f of the power receiving antenna 204. If the control unit 201 cannot detect the power Wn coinciding with the power P4, the control unit 201 may set the resonant frequency fn corresponding to power Wn that has a small difference from the power P4 and is higher than the power P4 as the resonant frequency f of the power receiving antenna 204. The control unit 201 controls the resonance circuit 205 so that the resonant frequency f of the power receiving antenna 204 coincides with the resonant frequency fn set by using the first table.

For example, if the power P4 corresponds to the power W8, the control unit 201 sets the resonant frequency f8 as the resonant frequency f of the power receiving antenna 204. The control unit 201 controls the resonance circuit 205 so that the resonant frequency f of the power receiving antenna 204 coincides with the resonant frequency f8. The power W8 is higher than the power W1. The power increases in order of the power W1 to W10. The control unit 201 stores information indicating the resonant frequency fn detected by using the first table, into the memory 202. The flowchart proceeds from step S805 to step S806.

In step S806, the control unit 201 controls the regulator 207 to supply the power received from the power supply unit 100 via the power receiving antenna 204 to the charge and discharge control unit 209. The control unit 201 controls the charge and discharge control unit 209 to charge the battery 210. The control unit 201 further controls the regulator 207 to supply the power received from the power supply apparatus 100 via the power receiving antenna 204 to the load circuit 208. The control unit 201 controls the load circuit 208 to perform the predetermined operation. The flowchart proceeds to step S605 of FIG. 6.

In step S807, the control unit 201 determines whether the power P3 detected in step S803 is lower than or equal to the power Pmax. If the control unit 201 determines that the power P3 is lower than or equal to the power Pmax (YES in step S807), the flowchart proceeds from step S807 to step S808. If the control unit 201 determines that the power P3 is not equal to or lower than the power Pmax (NO in step S807), the flowchart proceeds from step S807 to step S810.

In step S808, the control unit 201 detects the resonant frequency corresponding to the power P3, and controls the resonance circuit 205 so that the resonant frequency f of the power receiving antenna 204 coincides with the resonant frequency corresponding to the power P3. For example, the control unit 201 detects the resonant frequency corresponding to the power P3 by using the first table of FIG. 7A. Using the first table, the control unit 201 detects the power Wn coinciding with the power P3, and sets the resonant frequency fn corresponding to the detected power Wn as the resonant frequency f of the power receiving antenna 204. If the control unit 201 cannot detect the power Wn coinciding with the power P3, the control unit 201 sets the resonant frequency fn corresponding to power Wn that has a small difference from the power P3 and is higher than the power P3 as the resonant frequency f of the power receiving antenna 204. The control unit 201 controls the resonance circuit 205 so that the resonant frequency f of the power receiving antenna 204 coincides with the resonant frequency fn set by using the first table.

For example, if the power P3 corresponds to the power W5, the control unit 201 sets the resonant frequency f5 as the resonant frequency f of the power receiving antenna 204. The control unit 201 controls the resonance circuit 205 so that the resonant frequency f of the power receiving antenna 204 coincides with the resonant frequency f5. The power W5 is higher than the power W1 and lower than the power W8. The control unit 201 stores information indicating the resonant frequency fn detected by using the first table into the memory 202. The flowchart proceeds from step S808 to step S809.

In step S809, the control unit 201 controls the regulator 207 to supply the power received from the power supply apparatus 100 via the power receiving antenna 204 to the load circuit 208. The control unit 201 controls the load circuit 208 to perform the predetermined operation. The flowchart proceeds to step S605 of FIG. 6.

In step S810, the control unit 201 detects a difference in power between the power P3 and the power Pmax. Using the information indicating the remaining level of the battery 210 detected by the charge and discharge control unit 209, the control unit 201 further determines whether the battery 210 can supply the difference in power between the power P3 and the power Pmax to the first electronic apparatus 200.

If the control unit 201 determines that the battery 210 can supply the difference in power between the power P3 and the power Pmax to the first electronic apparatus 200 (YES in step S810), the flowchart proceeds from step S810 to step S811. If the control unit 201 determines that the battery 210 cannot supply the difference in power between the power P3 and the power Pmax to the first electronic apparatus 200 (NO in step S810), the flowchart proceeds from step S810 to step S812.

In step S811, the control unit 201 controls the resonance circuit 205 so that the resonant frequency f of the power receiving antenna 204 coincides with the resonant frequency f10 corresponding to the power Pmax. The flowchart proceeds from step S811 to step S809. If the resonant frequency f of the power receiving antenna 204 has already been set to the resonant frequency f10 corresponding to the power Pmax, the control unit 201 may omit the process of step S811 and perform the process of step S809.

If the battery 210 can supply the difference in power between the power P3 and the power Pmax to the first electronic apparatus 200 (YES in step S810) and the control unit 201 performs the process of step S809, the control unit 201 controls the charge and discharge control unit 209 to discharge the battery 210 before performing the process of step S809. Then in step S809, the control unit 201 controls the regulator 207 to supply the power discharged from the battery 210 to the load circuit 208, and controls the load circuit 208 to perform the predetermined operation.

In step S812, the control unit 201 disables the predetermined operation instructed by the user in step S801. The control unit 201 issues a warning indicating that the predetermined operation instructed by the user cannot be performed. For example, the control unit 201 may display the warning indicating that the predetermined operation cannot be performed on a not-illustrated display unit. The control unit 201 may issue the warning that the predetermined operation cannot be performed by lighting a not-illustrated light-emitting diode (LED) included in the first electronic apparatus 200. The flowchart then proceeds from step S812 to step S813. The control unit 201 may disable the predetermined operation until the battery 210 becomes able to supply the difference in power between the power P3 and the power Pmax to the first electronic apparatus 200.

In step S813, like in step S802, the control unit 201 detects the power P2. The control unit 201 stores information indicating the power P2 in the memory 202. The flowchart proceeds from step S813 to step S814.

In step S814, the control unit 201 detects the resonant frequency corresponding to the power P2. The control unit 201 controls the resonance circuit 205 so that the resonant frequency f of the power receiving antenna 204 coincides with the resonant frequency corresponding to the power P2.

For example, the control unit 201 detects the resonant frequency corresponding to the power P2 by using the first table of FIG. 7A. Using the first table, the control unit 201 detects the power Wn coinciding with the power P2, and sets the resonant frequency fn corresponding to the detected power Wn as the resonant frequency f of the power receiving antenna 204. If the control unit 201 cannot detect the power Wn coinciding with the power P2, the control unit 201 may set the resonant frequency fn corresponding to power Wn that has a small difference from the power P2 and is higher than the power P2 as the resonant frequency f of the power receiving antenna 204. The control unit 201 controls the resonance circuit 205 so that the resonant frequency f of the power receiving antenna 204 coincides with the resonant frequency fn set by using the first table.

For example, if the power P2 corresponds to the power W3, the control unit 201 sets the resonant frequency f3 as the resonant frequency f of the power receiving antenna 204. The control unit 201 controls the resonance circuit 205 so that the resonant frequency f of the power receiving antenna 204 coincides with the resonant frequency f3. The power W3 is higher than the power W1 and lower than the power W8 and the power W5. The control unit 201 stores information indicating the resonant frequency fn detected by using the first table into the memory 202. The flowchart proceeds from step S814 to step S815.

In step S815, the control unit 201 controls the regulator 207 to supply the power received from the power supply apparatus 100 via the power receiving antenna 204 to the charge and discharge control unit 209. The control unit 201 control the charge and discharge control unit 209 to charge the battery 210. The present flowchart ends and proceeds to step S605 of FIG. 6.

In steps S606, S805, S808, and S814 of the first exemplary embodiment, the control unit 201 sets the resonant frequency f of the power receiving antenna 204 by using the first table of FIG. 7A. However, the exemplary embodiment is not limited thereto.

For example, in steps S606, S805, S808, and S814, the control unit 201 may set the resonant frequency f of the power receiving antenna 204 by using a second table illustrated in FIG. 7B. The second table is a table in which the power reception efficiency En of the first electronic apparatus 200 is associated with the resonant frequency fn. In steps S606, S805, S808, and S814, before the control unit 201 sets the resonant frequency f of the power receiving antenna 204, the control unit 201 calculates the power reception efficiency En of the first electronic apparatus 200 when receiving the needed power from the power supply apparatus 100. The control unit 201 calculates the power reception efficiency En by using the following equation (3):

$$En[\%] = \frac{Pn}{P\max} \quad (3)$$

When the power reception efficiency En of the first electronic apparatus 200 is calculated by equation (3), the control unit 201 sets the resonant frequency fn corresponding to the power reception efficiency En of the first electronic apparatus 200 calculated by equation (3) as the resonant frequency f of the power receiving antenna 204. In the process of step S606, Pn in equation (3) is the power P1. In the process of step S805, Pn in equation (3) is the power P4. In the process of step S808, Pn in equation (3) is the power P3. In the process of step S814, Pn in equation (3) is the power P2.

If the calculated power reception efficiency En is not registered in the second table, the control unit 201 sets the resonant frequency f of the power receiving antenna 204 to the resonant frequency corresponding to a power reception efficiency that has a small difference from the calculated power reception efficiency En and is higher than the calculated power reception efficiency En. The control unit 201 then controls the resonance circuit 205 so that the resonant frequency f of the power receiving antenna 204 coincides with the resonant frequency fn set by using the second table. For example, in the process of step S606, the control unit 201 calculates the power reception efficiency E1 when receiving the power P1 from the power supply apparatus 100 based on the power P1, the power Pmax, and equation (3). The control unit 201 then sets the resonant frequency fl corresponding to the calculated power reception efficiency E1 as the resonant frequency f of the power receiving antenna 204. The control unit 201 controls the resonance circuit 205 so that the resonant frequency f of the power receiving antenna 204 coincides with the resonant frequency fl.

Figure 6:
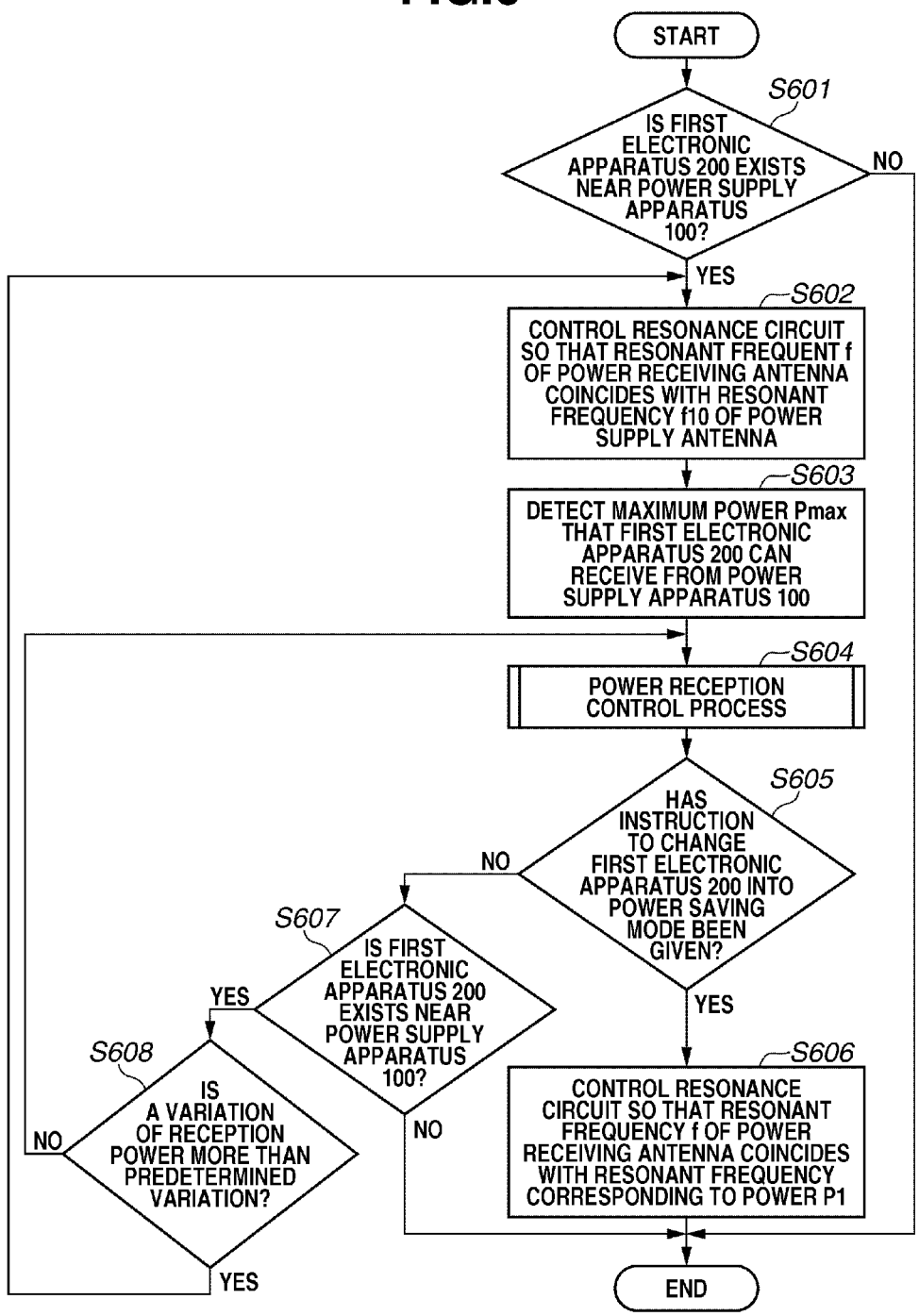
FIG. 6 is a flowchart illustrating an example of control process performed by the first electronic apparatus according to the first and second exemplary embodiments of the present invention.

If the first electronic apparatus 200 is performing the control process of FIG. 6 or the power reception control process of FIG. 8 and the battery 210 is detected to be fully charged, the control unit 201 may end the control process of FIG. 6 or the power reception control process of FIG. 8. If the first electronic apparatus 200 is perform the control process of FIG. 6 or the power reception control process of FIG. 8 and a commercial power source is connected to the first electronic apparatus 200, the control unit 201 may end the control process of FIG. 6 or the power reception control process of FIG. 8.

As described above, the first electronic apparatus 200 according to the first exemplary embodiment sets the resonant frequency f of the power receiving antenna 204 according to the power needed by the first electronic apparatus 200. The first electronic apparatus 200 thereby controls the power to receive from the power supply apparatus 100.

If the first electronic apparatus 200 can receive the power Pmax from the power supply apparatus 100 and the first electronic apparatus 200 needs the power P1, the first electronic apparatus 200 controls the resonant frequency f of the power receiving antenna 204 to receive the power P1 from the power supply apparatus 100. If the first electronic apparatus 200 can receive the power Pmax from the power supply apparatus 100 and the first electronic apparatus 200 needs the power P2, the first electronic apparatus 200 controls the resonant frequency f of the power receiving antenna 204 to receive the power P2 from the power supply apparatus 100. If the first electronic apparatus 200 can receive the power Pmax from the power supply apparatus 100 and the first electronic apparatus 200 needs the power P3, the first electronic apparatus 200 controls the resonant frequency f of the power receiving antenna 204 to receive the power P3 from the power supply apparatus 100. If the first electronic apparatus 200 can receive the power Pmax from the power supply apparatus 100 and the electronic apparatus 200 needs the power P4, the first electronic apparatus 200 controls the resonant frequency f of the power receiving antenna 204 to receive the power P4 from the power supply apparatus 100.

Consequently, even if the power supply apparatus 100 supplies power more than needed by the first electronic apparatus 200, to the first electronic apparatus 200, the first electronic apparatus 200 controls the resonant frequency f of the power receiving antenna 204 not to receive power more than needed.

This can prevent excessive power from being supplied from the power supply apparatus 100 to the first electronic apparatus 200 even if the power supply apparatus 100 supplies power more than needed by the first electronic apparatus 200, to the first electronic apparatus 200.

If the second electronic apparatus 300 capable of receiving power from the power supply apparatus 100 is located near the power supply apparatus 100, the power not received by the first electronic apparatus 200 is supplied to the second electronic apparatus 300. This can prevent the extra power from being wasted in the first electronic apparatus 200.

Accordingly, the first electronic apparatus 200 detects the needed power according to the state of the first electronic apparatus 200, and limits the power to be received from the power supply apparatus 100 based on the detected power. The first electronic apparatus 200 can thus prevent excessive power from being supplied thereto.

Note that "the power needed by the first electronic apparatus 200" may be rephrased as the "the power consumed by the first electronic apparatus 200."

A second exemplary embodiment will be described which deals with a configuration and processing different from those of the first exemplary embodiment. A description of a configuration and processing common to the first exemplary embodiment will be omitted.

In steps S606, S805, S808, and S814 of the first exemplary embodiment, the control unit 201 sets the resonant frequency f of the power receiving antenna 204 by using one of the first and second tables. In the second exemplary embodiment, the control unit 201 sets the Q value of the first electronic apparatus 200 instead of setting the resonant frequency f of the power receiving antenna 204. The control unit 201 thereby controls the power the first electronic apparatus 200 receives from the power supply apparatus 100.

Suppose that the control unit 201 performs the control process of FIG. 6 according to the second exemplary embodiment. In step S606, the control unit 201 detects Qn corresponding to the power P1, and controls the resonance circuit 205 so that the Q value of the first electronic apparatus 200 coincides with Qn corresponding to the power P1. For example, the control unit 201 detects the Q value corresponding to the power P1 by using a third table illustrated in FIG. 7C. The third table is a table in which the power Wn to be received from the power supply apparatus 100 is associated with the Q value Qn of the first electronic apparatus 200. By using the third table, the control unit 201 detects the power Wn coinciding with the power P1, and sets Qn corresponding to the detected power Wn as the Q value of the first electronic apparatus 200. If the control unit 201 cannot detect the power Wn coinciding with the power P1, the control unit 201 may set Qn corresponding to power Wn that has a small difference from the power P1 and is higher than the power P1 as the Q value of the first electronic apparatus 200. The control unit 201 controls the resonance circuit 205 so that the Q value of the first electronic apparatus 200 coincides with Qn set by using the third table. For example, if the power P1 corresponds to the power W1, the control unit 201 sets Q1 as the Q value of the power receiving antenna 204. The control unit 201 controls the resonance circuit 205 so that the Q value of the first electronic apparatus 200 coincides with Q1. The control unit 201 stores information indicating Qn detected by using the third table into the memory 202. In this case, the flowchart ends.

Suppose that the control unit 201 performs the power reception control process of FIG. 8 according to the second exemplary embodiment. In step S805, the control unit 201 detects Qn corresponding to the power P4, and controls the resonance circuit 205 so that the Q value of the first electronic apparatus 200 coincides with Qn corresponding to the power P4. For example, the control unit 201 detects Qn corresponding to the power P4 by using the third table of FIG. 7C. The control unit 201 detects the power Wn coinciding with the power P4, and sets Qn corresponding to the detected power Wn as the Q value of the first electronic apparatus 200. If the control unit 201 cannot detect the power Wn coinciding with the power P4, the control unit 201 may set Qn corresponding to power Wn that has a small difference from the power P4 and is higher than the power P4 as the Q value of the first electronic apparatus 200.

For example, if the power P4 corresponds to the power W8, the control unit 201 sets Q8 as the Q value of the power receiving antenna 204. The control unit 201 controls the resonance circuit 205 so that the Q value of the first electronic apparatus 200 coincides with Q8. The power W8 is higher than the power W1. Q8 is greater than Q1. The Q value increases in order of Q1 to Q8. The control unit 201 stores information indicating Qn detected by using the third table into the memory 202. In this case, the flowchart proceeds from step S805 to step S806.

Suppose that the control unit 201 performs the power reception control process of FIG. 8 according to the second exemplary embodiment. In step S808, the control unit 201 detects Qn corresponding to the power P3, and controls the resonance circuit 205 so that the Q value of the first electronic apparatus 200 coincides with Qn corresponding to the power P3. For example, the control unit 201 detects Qn corresponding to the power P3 by using the third table of FIG. 7C. The control unit 201 detects the power Wn coinciding with the power P3, and sets Qn corresponding to the detected power Wn as the Q value of the first electronic apparatus 200. If the control unit 201 cannot detect the power Wn coinciding with the power P3, the control unit 201 sets Qn corresponding to power Wn that has a small difference from the power P3 and is higher than the power P3 as the Q value of the first electronic apparatus 200. For example, if the power P3 corresponds to the power W5, the control unit 201 sets Q5 as the Q value of the first electronic apparatus 200. The control unit 201 controls the resonance circuit 205 so that the Q value of the first electronic apparatus 200 coincides with Q5. The power W5 is higher than the power W1 and lower than the power W8. Q5 is greater than Q1 and smaller than Q8. The control unit 201 stores information indicating Qn detected by the third table into the memory 202. In this case, the flowchart proceeds from step S808 to step S809.

Suppose that the control unit 201 performs the power reception control process of FIG. 8 according to the second exemplary embodiment. In step S814, the control unit 201 detects Qn corresponding to the power P2, and controls the resonance circuit 205 so that the Q value of the first electronic apparatus 200 coincides with Qn corresponding to the power P2. For example, the control unit 201 detects Qn corresponding to the power P2 by using the third table of FIG. 7C. The control unit 201 detects the power Wn coinciding with the power P2, and sets Qn corresponding to the detected power Wn as the Q value of the first electronic apparatus 200. If the control unit 201 cannot detect the power Wn coinciding with the power P2, the control unit 201 sets Qn corresponding to power Wn that has a small difference from the power P2 and is higher than the power P2 as the Q value of the first electronic apparatus 200.

For example, if the power P2 corresponds to the power W3, the control unit 201 sets Q3 as the Q value of the first electronic apparatus 200. The control unit 201 controls the resonance circuit 205 so that the Q value of the first electronic apparatus 200 coincides with Q3. The power W3 is higher than the power W1 and lower than the power W8 and the power W5. Q3 is greater than Q1 and smaller than Q8 and Q5. The control unit 201 stores information indicating Qn detected by using the third table into the memory 202. In this case, the flowchart proceeds from step S814 to step S815.

As described above, the first electronic apparatus 200 according to the second exemplary embodiment sets the Q value of the first electronic apparatus 200 according to the power needed by the first electronic apparatus 200. The first electronic apparatus 200 thereby controls the power the first electronic apparatus 200 receives from the power supply apparatus 100.

If the first electronic apparatus 200 can receive the power Pmax from the power supply apparatus 100 and the first electronic apparatus 200 needs the power P1, the first electronic apparatus 200 controls the Q value of the first electronic apparatus 200 to receive the power P1 via the power receiving antenna 204. If the first electronic apparatus 200 can receive the power Pmax from the power supply apparatus 100 and the first electronic apparatus 200 needs the power P2, the first electronic apparatus 200 controls the Q value of the first electronic apparatus 200 to receive the power P2 via the power receiving antenna 204. If the first electronic apparatus 200 can receive the power Pmax from the power supply apparatus 100 and the first electronic apparatus 200 needs the power P3, the first electronic apparatus 200 controls the Q value of the first electronic apparatus 200 to receive the power P3 via the power receiving antenna 204. If the first electronic apparatus 200 can receive the power Pmax from the power supply apparatus 100 and the first electronic apparatus 200 needs the power P4, the first electronic apparatus 200 controls the Q value of the first electronic apparatus 200 to receive the power P4 via the power receiving antenna 204.

Consequently, even if the power supply apparatus 100 supplies power more than needed by the first electronic apparatus 200 to the first electronic apparatus 200, the first electronic apparatus 200 controls the Q value of the first electronic apparatus 200 not to receive power more than needed.

This can prevent excessive power from being supplied from the power supply apparatus 100 to the first electronic apparatus 200 even if the power supply apparatus 100 supplies power more than needed by the first electronic apparatus 200 to the first electronic apparatus 200.

Further, the first electronic apparatus 200 according to the second exemplary embodiment can control the power the first electronic 200 receives from the power supply apparatus 100 without changing the resonant frequency f of the power receiving antenna 204. Another electronic apparatus located near the first electronic apparatus 200 may perform wireless communication at a predetermined frequency. In such a case, the first electronic apparatus 200 according to the second exemplary embodiment can prevent the other electronic apparatus from being affected by a change of the resonant frequency f of the power receiving antenna 204.

As far as the configuration and processing common to the first exemplary embodiment are concerned, the first electronic apparatus 200 according to the second exemplary embodiment has effects similar to those described in the first exemplary embodiment.

The electronic apparatus according to an exemplary embodiment of the present invention is not limited to the first electronic apparatus 200 described in the first and second exemplary embodiments. For example, the electronic apparatus 200 may change both the resonant frequency and the Q value for optimization, instead of changing only one of the resonant frequency and the Q value.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-239282 filed Oct. 30, 2012, which is hereby incorporated by reference herein in its entirety.

What is claimed is:

1. An electronic apparatus comprising:
  a power receiving unit configured to wirelessly receive power from an external apparatus;
  a resonance unit configured to set at least one of a resonant frequency of the power receiving unit and a characteristic value of the electronic apparatus, the characteristic value indicating a resonance characteristic of the electronic apparatus; and
  a control unit configured to, before the electronic apparatus performs a predetermined operation, detect data indicating power for performing the predetermined operation, and control the resonance unit to set at least one of the resonant frequency of the power receiving unit and the characteristic value of the electronic apparatus based on the detected data,
  wherein the control unit is configured to perform the predetermined operation by using power received based on the at least one of the resonant frequency of the power receiving unit and the characteristic value of the electronic apparatus set by the resonance unit.

2. The electronic apparatus according to claim 1, further comprising a charging unit configured to perform a charging operation for charging a battery connected to the electronic apparatus,
  wherein the control unit is configured to, before the charging operation is performed, control the resonance unit to set at least one of the resonant frequency of the power receiving unit and the characteristic value of the electronic apparatus based on power for performing the charging operation, and
  wherein the charging unit is configured to perform the charging operation by using the power received based on the at least one of the resonant frequency and the characteristic value of the electronic apparatus set by the resonance unit.

3. The electronic apparatus according to claim 2, further comprising a determination unit configured to determine whether the power for performing the predetermined operation and the charging operation is lower than predetermined power,
  wherein the control unit is configured to control the resonance unit to set at least one of the resonant frequency of the power receiving unit and the characteristic value of the electronic apparatus based on the determination of the determination unit.

4. The electronic apparatus according to claim 3, wherein the control unit is configured to, if the power for performing the predetermined operation and the charging operation is lower than the predetermined power, control the resonance unit to set at least one of the resonant frequency of the power receiving unit and the characteristic value of the electronic apparatus based on the power for performing the predetermined operation and the charging operation.

5. The electronic apparatus according to claim 3, wherein the control unit is configured to, if the power for performing the predetermined operation and the charging operation is not lower than the predetermined power, control the resonance unit to set at least one of the resonant frequency of the power receiving unit and the characteristic value of the electronic apparatus based on the power for performing the predetermined operation.

6. The electronic apparatus according to claim 3, wherein the control unit is configured to, if the power for performing the predetermined operation and the charging operation is not lower than the predetermined power, perform control to perform the predetermined operation without performing the charging operation.

7. The electronic apparatus according to claim 3, wherein the control unit is configured to, if the power for performing the predetermined operation and the charging operation is not lower than the predetermined power and the power for performing the predetermined operation is lower than the predetermined power, control the resonance unit to set at least one of the resonant frequency of the power receiving unit and the characteristic value of the electronic apparatus based on the power for performing the predetermined operation.

8. The electronic apparatus according to claim 3, wherein the control unit is configured to, if the power for performing the predetermined operation and the charging operation is not lower than the predetermined power, the power for performing the predetermined operation is lower than the predetermined power, and the battery supplies power, control the resonance unit to set at least one of the resonant frequency of the power receiving unit and the characteristic value of the electronic apparatus based on the predetermined power.

9. The electronic apparatus according to claim 3, wherein the control unit is configured to, if the power for performing the predetermined operation and the charging operation is not lower than the predetermined power, the power for performing the predetermined operation is not lower than the predetermined power, and the battery does not supply power, perform control not to perform the predetermined operation.

10. The electronic apparatus according to claim 1, wherein the characteristic value of the electronic apparatus is a quality factor of the electronic apparatus.

11. A method for controlling an electronic apparatus including a power receiving unit configured to wirelessly receive power from an external apparatus, the method comprising:
  before the electronic apparatus performs a predetermined operation, detecting data indicating power for performing the predetermined operation;
  before the electronic apparatus performs the predetermined operation, setting at least one of a resonant frequency of the power receiving unit and a characteristic value of the electronic apparatus based on the detected data, the characteristic value indicating a resonance characteristic of the electronic apparatus; and
  performing the predetermined operation by using power received based on the set at least one of the resonant frequency and characteristic value of the electronic apparatus.

12. A non-transitory computer-readable storage medium storing a computer program for controlling an electronic apparatus including a power receiving unit configured to wirelessly receive power from an external apparatus, the computer program comprising:
  before the electronic apparatus performs a predetermined operation, detecting data indicating power for performing the predetermined operation;

before the electronic apparatus performs the predetermined operation, setting at least one of a resonant frequency of the power receiving unit and a characteristic value of the electronic apparatus based on the detected data, the characteristic value indicating a resonance characteristic of the electronic apparatus; and performing the predetermined operation by using power received based on the set at least one of the resonant frequency and characteristic value of the electronic apparatus.

13. An electronic apparatus comprising:
a power receiving unit configured to wirelessly receive power from an external apparatus;
a resonance unit configured to set at least one of a resonant frequency of the power receiving unit and a characteristic value of the electronic apparatus, the characteristic value indicating a resonance characteristic of the electronic apparatus; and
a control unit configured to, before the electronic apparatus performs a predetermined operation, determine power for performing the predetermined operation, and control the resonance unit to set at least one of the resonant frequency of the power receiving unit and the characteristic value of the electronic apparatus based on the determined power,
wherein the control unit is configured to perform the predetermined operation by using power received in a state where the at least one of the resonant frequency of the power receiving unit and the characteristic value of the electronic apparatus is set by the resonance unit.

14. The electronic apparatus according to claim 13, further comprising a charging unit configured to perform a charging operation for charging a battery connected to the electronic apparatus,
wherein the control unit is configured to, before the charging operation is performed, control the resonance unit to set at least one of the resonant frequency of the power receiving unit and the characteristic value of the electronic unit based on power for performing the charging operation, and
wherein the charging unit is configured to perform the charging operation by using the power received based on the at least one of the resonant frequency and the characteristic value of the electronic apparatus set by the resonance unit.

15. The electronic apparatus according to claim 14, wherein the control unit further determines whether the power for performing the predetermined operation and the charging operation is lower than predetermined power, and
wherein the control unit is configured to control the resonance unit to set at least one of the resonant frequency of the power receiving unit and the characteristic value of the electronic apparatus based on the determination of the control unit.

16. The electronic apparatus according to claim 15, wherein the control unit is configured to, if the power for performing the predetermined operation and the charging operation is lower than the predetermined power, control the resonance unit to set at least one of the resonant frequency of the power receiving unit and the characteristic value of the electronic apparatus based on the power for performing the predetermined operation and the charging operation.

17. The electronic apparatus according to claim 15, wherein the control unit is configured to, if the power for performing the predetermined operation and the charging operation is not lower than the predetermined power, control the resonance unit to set at least one of the resonant frequency of the power receiving unit and the characteristic value of the electronic apparatus based on the power for performing the predetermined operation.

18. The electronic apparatus according to claim 15, wherein the control unit is configured to, if the power for performing the predetermined operation and the charging operation is not lower than the predetermined power, perform control to perform the predetermined operation without performing the charging operation.

19. A method for controlling an electronic apparatus including a power receiving unit configured to wirelessly receive power from an external apparatus, the method comprising:
before the electronic apparatus performs a predetermined operation, determining power for performing the predetermined operation;
before the electronic apparatus performs the predetermined operation, setting at least one of a resonant frequency of the power receiving unit and a characteristic value of the electronic apparatus based on the determined power, the characteristic value indicating a resonance characteristic of the electronic apparatus; and
performing the predetermined operation by using power received in a state where the at least one of the resonant frequency and characteristic value of the electronic apparatus is set.

20. A non-transitory computer-readable storage medium storing a computer program for controlling an electronic apparatus including a power receiving unit configured to wirelessly receive power from an external apparatus, the computer program comprising:
before the electronic apparatus performs a predetermined operation, determining power for performing the predetermined operation;
before the electronic apparatus performs the predetermined operation, setting at least one of a resonant frequency of the power receiving unit and a characteristic value of the electronic apparatus based on the determined power, the characteristic value indicating a resonance characteristic of the electronic apparatus; and
performing the predetermined operation by using power received in a state where the at least one of the resonant frequency and characteristic value of the electronic apparatus is set.

* * * * *